US008749838B2

(12) United States Patent
Ono

(10) Patent No.: US 8,749,838 B2
(45) Date of Patent: Jun. 10, 2014

(54) CORRECTING MAGNIFICATION OF A SCANNED ORIGINAL BY ADJUSTING A WRITING CLOCK SIGNAL

(71) Applicant: Katsuhiro Ono, Ibaraki (JP)

(72) Inventor: Katsuhiro Ono, Ibaraki (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/838,191

(22) Filed: Mar. 15, 2013

(65) Prior Publication Data

US 2013/0278945 A1 Oct. 24, 2013

(30) Foreign Application Priority Data

Mar. 23, 2012 (JP) ................................ 2012-067569
Oct. 30, 2012 (JP) ................................ 2012-239122

(51) Int. Cl.
*G06K 15/02* (2006.01)

(52) U.S. Cl.
USPC .......................................................... 358/1.2

(58) Field of Classification Search
CPC .............. G06K 15/1223; H04N 1/393; H04N 1/33315; H04N 1/3935; H04N 1/0402; H04N 1/0446
USPC .......................................................... 358/1.2
See application file for complete search history.

(56) References Cited

U.S. PATENT DOCUMENTS

2003/0043256 A1* 3/2003 Conrow et al. ............... 347/248
2003/0175602 A1 9/2003 Kazama
2003/0209660 A1 11/2003 Kanno
2005/0200930 A1 9/2005 Kanno
2005/0206744 A1 9/2005 Ohkawara et al.
2007/0139715 A1 6/2007 Kazama et al.
2007/0291327 A1 12/2007 Saito
2008/0297810 A1 12/2008 Motoyama
2009/0185207 A1 7/2009 Saito
2010/0231940 A1 9/2010 Kaima
2011/0063680 A1 3/2011 Ohyama
2011/0228286 A1 9/2011 Kaima
2011/0228287 A1 9/2011 Kaima

FOREIGN PATENT DOCUMENTS

JP 62-146066 * 6/1987
JP 2002-354234 12/2002
JP 2003-266761 9/2003
JP 2004-230856 8/2004
JP 2004-246164 9/2004
JP 2004-271926 9/2004
JP 2004-347842 12/2004

(Continued)

*Primary Examiner* — Eric A Rust
(74) *Attorney, Agent, or Firm* — Oblon, Spivak, McClelland, Maier & Neustadt, L.L.P.

(57) ABSTRACT

An image forming apparatus includes a writing unit including an image data generation unit that produces image data; a main-sub image magnification processing unit that performs image magnification processing in a main-scanning direction and a sub-scanning direction; a clock generation unit that changes a writing clock period; a correction map that retains image magnification information corresponding to a deformation of a recording medium caused by application of heat and pressure from a fixing unit; and a light-emitting device that irradiates the photosensitive element with light. The writing unit slightly changes the writing clock period so as to enlarge or shrink a formed pixel in the main-scanning direction and perform enlargement or shrinkage in the sub-scanning direction, and thus cancel an image deformation caused by the deformation of the recording medium and correct a change in an image magnification in the main-scanning direction.

12 Claims, 11 Drawing Sheets

(56) References Cited

FOREIGN PATENT DOCUMENTS

| | | |
|---|---|---|
| JP | 2005-297536 | 10/2005 |
| JP | 2006-198999 | 8/2006 |
| JP | 2007-045074 | 2/2007 |
| JP | 3918919 | 2/2007 |
| JP | 2007-163789 | 6/2007 |
| JP | 2007-174060 | 7/2007 |
| JP | 4218700 | 11/2008 |
| JP | 2009-060246 | 3/2009 |
| JP | 2009-083472 | 4/2009 |
| JP | 2009-151286 | 7/2009 |
| JP | 4343558 | 7/2009 |
| JP | 2009-175333 | 8/2009 |
| JP | 2010-213117 | 9/2010 |
| JP | 4593884 | 9/2010 |
| JP | 2011-043533 | 3/2011 |
| JP | 2011-061463 | 3/2011 |
| JP | 2011-084065 | 4/2011 |
| JP | 2011-143580 | 7/2011 |
| JP | 4799482 | 8/2011 |
| JP | 2011-197158 | 10/2011 |
| JP | 2011-199436 | 10/2011 |

* cited by examiner

FIG.3A FIG.3B FIG.3C
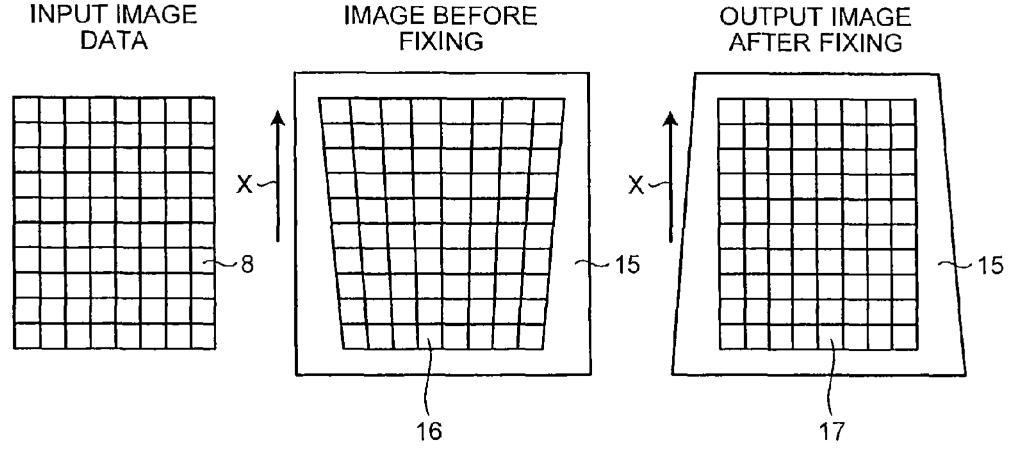
FIG. 4A
FIG. 4B
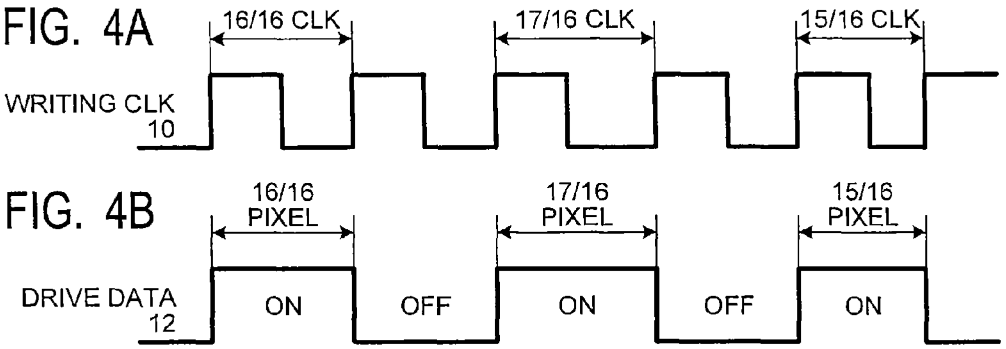

FIG.13A
FIG.13B
FIG.13C
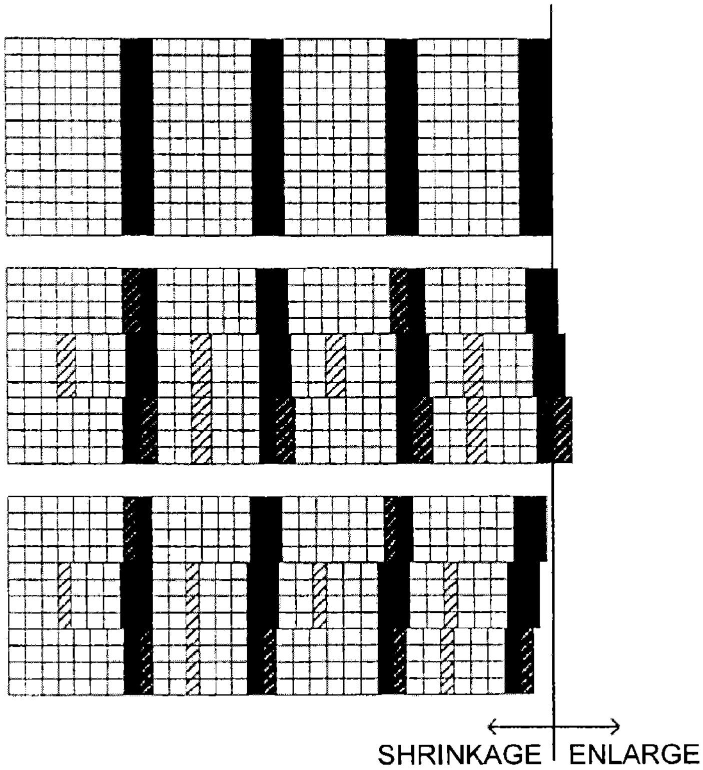
FIG.14A
FIG.14B
FIG.14C
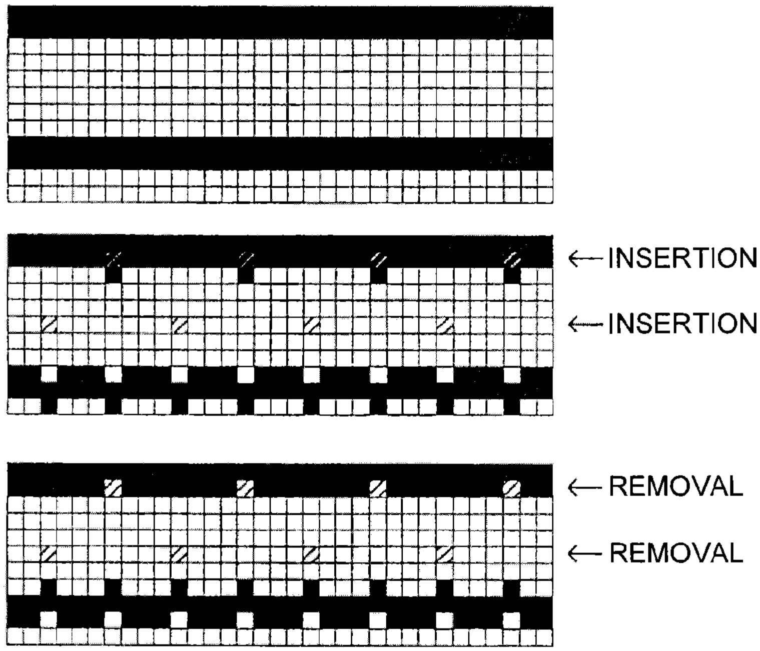

CORRECTING MAGNIFICATION OF A SCANNED ORIGINAL BY ADJUSTING A WRITING CLOCK SIGNAL

CROSS-REFERENCE TO RELATED APPLICATIONS

The present application claims priority to and incorporates by reference the entire contents of Japanese Patent Application No. 2012-067569 filed in Japan on Mar. 23, 2012 and Japanese Patent Application No. 2012-239122 filed in Japan on Oct. 30, 2012.

BACKGROUND OF THE INVENTION

1. Field of the Invention

The present invention relates to an image forming apparatus.

2. Description of the Related Art

Variable data printing for small lots and multiple products has undergone a shift from conventional offset printing to printing using electrophotographic image forming apparatuses. This shift requires the image forming apparatuses to provide the same level of image quality and registration accuracy as those of offset printing machines.

In image forming apparatuses including fixing units, sheets are sometimes expanded and shrunk due to fixing. Specifically, an image magnification varies entirely in a main-scanning direction and a sub-scanning direction due to fixing temperature, fixing pressure, and sheet moisture content, for example. Particularly, in the main-scanning direction, the width of a discharged sheet differs in the leading end and the trailing end thereof in some cases because the sheet is subjected to fixing and pressing while tensional force is applied in the width direction of the sheet to prevent the sheet from being wrinkled. As a result, deformation of an image occurs in a page of the sheet in some cases. In other words, a phenomenon of changing in image magnification occurs in some cases. In addition, the change differs in the front and the back sides of the sheet, thereby influencing the image quality of output images and the registration accuracy.

A technique has been known that detects a deformation of a sheet or an output image and corrects the image magnification on the basis of the detected deformation.

In a conventional manner, the image magnification is corrected by inserting pixels in image data or removing pixels from the image data on a pixel basis when an image is formed. In such a correction, a correction unit is 42 μm when the image resolution is 600 dpi while the correction unit is 21 μm when the image resolution is 1200 dpi, for example. It is apparent that the correction performed by the insertion or removal of pixels on a pixel basis under such image resolution causes visual noises such as moire and banding to be noticeable.

The correction performed on a pixel basis requires that the image resolution is equal to or larger than 2400 dpi in the main-scanning and the sub-scanning directions. In this case, image data amount in forming an image is 16 times larger than when the image resolution is 600 dpi in the main-scanning and the sub-scanning directions, and 4 times larger than when the image resolution is 1200 dpi in the main-scanning and the sub-scanning directions, thereby causing a problem in that the number of data buffers such as memories increases and the data needs to be processed at higher speed.

It is indeed necessary to correct the image magnification in the sub-scanning direction by the insertion or removal of pixels on a pixel basis under a high image resolution. In contrast, it is not necessary to correct the image magnification in the main-scanning direction under a high image resolution.

Japanese Patent No. 3918919 discloses image magnification correction with reference to a specific example in which the image resolution is 2400 dpi in the main-scanning and the sub-scanning directions. To cancel a deformation occurring in forming an image on a sheet, provided are an image storage unit that stores therein input image data, an image analysis unit that analyzes a deformation of an output image, a correction data generation unit that cancels the deformation occurring in the output image, and an image correction unit that performs correction processing on the input image data, and the image correction unit adds pixels to one side of the image data, inserts pixels in the image data with appropriate intervals, or adds the pixels to both sides of the image data. Japanese Patent Application Laid-open No. 2007-174060 discloses image magnification correction in which high resolution equal to or larger than 2400 dpi is required.

Those correction manners, however, do not solve the problem of the need to increase the number of data buffers such as memories and to process data at higher speed.

There is a need to provide an image forming apparatus that can adjust a change in the image magnification without using high-resolution data.

SUMMARY OF THE INVENTION

It is an object of the present invention to at least partially solve the problems in the conventional technology.

An image forming apparatus includes: a photosensitive element; a charging unit that charges a surface of the photosensitive element; a writing unit that forms a static latent image on the photosensitive element by irradiating the charged surface of the photosensitive element with light based on input image data; a developing unit that supplies toner to the static latent image on the photosensitive element so as to form a toner image; a transfer unit that transfers the toner image onto a recording medium; and a fixing unit that fixes the toner image to the recording medium by applying heat and pressure to the toner image. The writing unit includes: a data buffer unit that buffers the input image data; an image data generation unit that produces image data; a main-sub image magnification processing unit that performs image magnification processing in a main-scanning direction and a sub-scanning direction; a clock generation unit that changes a writing clock period; a correction map that retains image magnification information corresponding to a deformation of the recording medium caused by application of heat and pressure from the fixing unit; and a light-emitting device that irradiates the photosensitive element with light on the basis of drive data from the image data generation unit. The writing unit is configured to slightly change the writing clock period so as to enlarge or shrink a formed pixel in the main-scanning direction and further perform enlargement or shrinkage in the sub-scanning direction with reference to the image magnification information of the correction map, and thus cancel an image deformation caused by the deformation of the recording medium and correct a change in an image magnification in the main-scanning direction.

An image forming apparatus includes: a photosensitive element; a charging unit that charges a surface of the photosensitive element; a writing unit that forms a static latent image on the photosensitive element by irradiating the charged surface of the photosensitive element with light based on input image data; a developing unit that supplies toner to the static latent image on the photosensitive element so as to form a toner image; an endless intermediate transfer member; an intermediate transfer unit that transfers the toner image on the photosensitive element onto the intermediate transfer member; a recording medium transfer unit that transfers the toner image on the intermediate transfer member onto a recording medium; and a fixing unit that fixes the toner image to the recording medium by applying heat and pressure to the toner image. The writing unit includes: a data buffer unit that buffers the input image data; an image data generation unit that produces image data; a main-sub image magnification processing unit that performs image magnification processing in a main-scanning direction and a sub-scanning direction; a clock generation unit that changes a writing clock period; a correction map that retains image magnification information corresponding to a deformation of the recording medium caused by application of heat and pressure from the fixing unit; and a light-emitting device that irradiates the photosensitive element with light on the basis of drive data from the image data generation unit. The writing unit is configured to slightly change the writing clock period so as to enlarge or shrink a formed pixel in the main-scanning direction and further perform enlargement or shrinkage in the sub-scanning direction with reference to the image magnification information of the correction map, and thus cancel an image deformation caused by the deformation of the recording medium and correct a change in an image magnification in the main-scanning direction.

An image forming apparatus includes: a photosensitive element; a charging unit that charges a surface of the photosensitive element; a writing unit that forms a static latent image on the photosensitive element by irradiating the charged surface of the photosensitive element with light based on input image data; a developing unit that supplies toner to the static latent image on the photosensitive element so as to form a toner image; a transfer unit that transfers the toner image onto a recording medium; a fixing unit that fixes the toner image to the recording medium by applying heat and pressure to the toner image; and sensors that are provided at an entrance and an exit of the recording medium to and from the fixing unit and detect an amount of a deformation of the recording medium occurring when the recording medium passes through the fixing unit. The writing unit includes: a data buffer unit that buffers the input image data; an image data generation unit that produces image data; a main-sub image magnification processing unit that performs image magnification processing in a main-scanning direction and a sub-scanning direction; a clock generation unit that changes a writing clock period; and a light-emitting device that irradiates the photosensitive element with light on the basis of drive data from the image data generation unit. Image magnification information is produced on the basis of deformation amount information of the recording medium from the sensors. The writing unit is configured to slightly change the writing clock period so as to enlarge or shrink a formed pixel in the main-scanning direction and further perform enlargement or shrinkage in the sub-scanning direction, and thus cancel an image deformation caused by the deformation of the recording medium and correct a change in an image magnification in the main-scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A to 3C are conceptual views for explaining countermeasures against a deformation of an output image after fixing in the embodiment, FIG. 3A being a schematic diagram illustrating input image data input to the writing module, FIG. 3B being a schematic diagram illustrating an image before fixing on the sheet, and FIG. 3C being a schematic diagram illustrating an image after fixing on the sheet;

FIGS. 4A and 4B are schematic diagrams for explaining production of drive data based on a writing clock in the embodiment;

FIGS. 13A to 13C are image views illustrating results of the image magnification correction in the main-scanning direction in the embodiment;

FIGS. 14A to 14C are image views illustrating results of the image magnification correction in a sub-scanning direction in the embodiment;

DETAILED DESCRIPTION OF THE PREFERRED EMBODIMENTS

A change in an image magnification in a main-scanning direction due to a deformation of a sheet can be corrected by switching periods of a writing clock in forming an image in accordance with the deformation of the sheet, without increasing the resolution of the image particularly in the main-scanning direction. For example, the image resolution in the main-scanning direction may be 600 dpi or 1200 dpi. As a result, a data amount is smaller than when the image resolution is 2400 dpi in the main-scanning direction and a sub-scanning direction in a conventional manner and the data does not need to be processed at high speed.

Without performing correction such that one pixel is inserted to or one pixel is removed from image data, the period of the writing clock is slightly changed periodically or at appropriate positions in accordance with the image magnification so as to enlarge or shrink each of the formed pixels in the main-scanning direction by a magnification correction amount, thereby increasing or decreasing the image magnification in the main-scanning direction. As a result, the change in the image magnification in the main-scanning direction is corrected so as to cancel the deformation of the image due to the sheet deformation. Consequently, the image magnification can be corrected without using high-resolution image data particularly in the main-scanning direction, which is required in the magnification correction performed by inserting a pixel to or removing a pixel from the image data.

Embodiment

An embodiment of the invention is described below. The invention has the following feature regarding a correction of an image magnification in a main-scanning direction in a page due to a deformation of a sheet.

The feature is that the image forming apparatus can correct the image magnification without using high-resolution data particularly in the main-scanning direction. This is because, in the image forming apparatus, the period of the writing clock is slightly changed periodically or at appropriate positions in accordance with the image magnification so as to enlarge or shrink a formed pixel in the main-scanning direction, thereby correcting the image magnification in the main-scanning direction so as to cancel the deformation of the image due to the sheet deformation, without performing correction such that a pixel is inserted to or removed from the image data.

Figure 1:
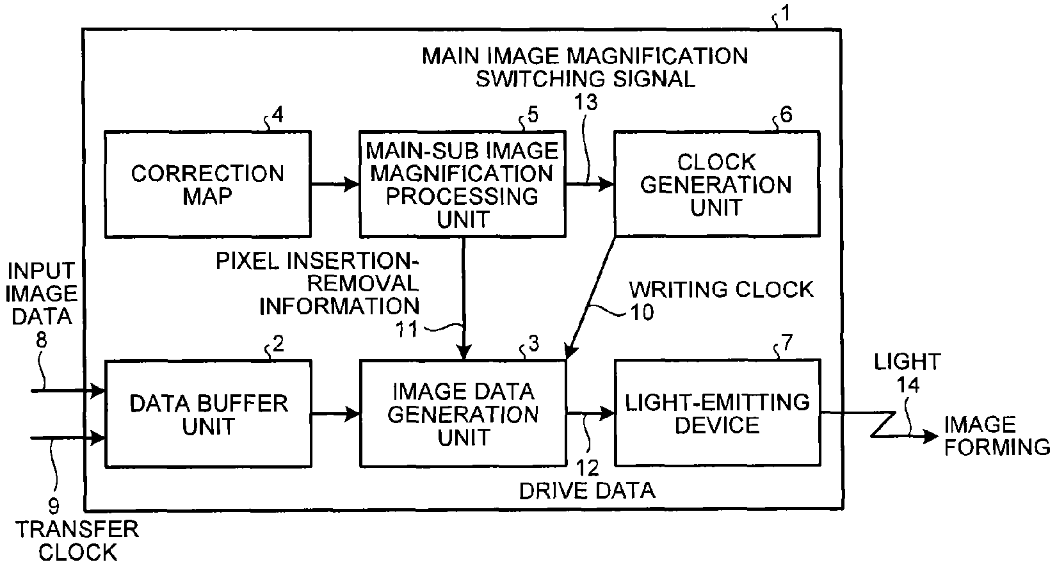
FIG. 1 is a block diagram of a writing module according to an embodiment of the invention.

An embodiment according to the invention is described below with reference to the accompanying drawings. FIG. 1 is a block diagram of a writing module according to the embodiment of the invention. This writing module 1 is mainly composed of a data buffer unit 2 that includes a memory and buffers input image data, an image data generation unit 3 that produces image data for forming images, a correction map 4 that retains image magnification information, a main-sub image magnification processing unit 5 that performs image magnification processing in the main-scanning and the sub-scanning directions using the correction map 4, a clock generation unit 6 that produces a writing clock, and a light-emitting device 7 that irradiates a photosensitive element with light so as to form images. The connection relationship among them is illustrated in FIG. 1.

The data buffer unit 2 buffers input image data 8 sent from a host apparatus (not illustrated) such as a controller using a transfer clock 9. The image data generation unit 3 produces image data on the basis of a writing clock 10 supplied from the clock generation unit 6 and a pixel insertion-removal information 11 supplied from the main-sub image magnification processing unit 5. The image data generation unit 3 outputs drive data 12, which controls the light-emitting device 7 to turn on and off in such a manner that a period of the writing clock 10 corresponds to one pixel used for forming an image.

The main-sub image magnification processing unit 5 produces a main image magnification switching signal 13 for performing image magnification switching in the main-scanning direction on the basis of the image magnification information in the main-scanning direction. The main-sub image magnification processing unit 5 also produces the pixel insertion-removal information 11 for inserting and removing pixels on the basis of the image magnification information in the sub-scanning direction.

The clock generation unit 6 operates at a frequency of 8 or 16 times higher than the writing clock 10 by being internally multiplied so as to change the clock period and furthermore to perform image correction such as pulse width modulation, which is a known technique, and basically produces the writing clock 10 at a frequency corresponding to an apparatus speed.

The correction map 4 retains correction value information relating to the image magnification for canceling the deformation of the image due to the deformation of the sheet. The light-emitting device 7, which is a semiconductor laser, a semiconductor laser array, or a surface emitting laser, irradiates the photosensitive element (not illustrated) with light 14 in accordance with the drive data 12 so as to form images in an electrophotographic manner.

Figure 2:
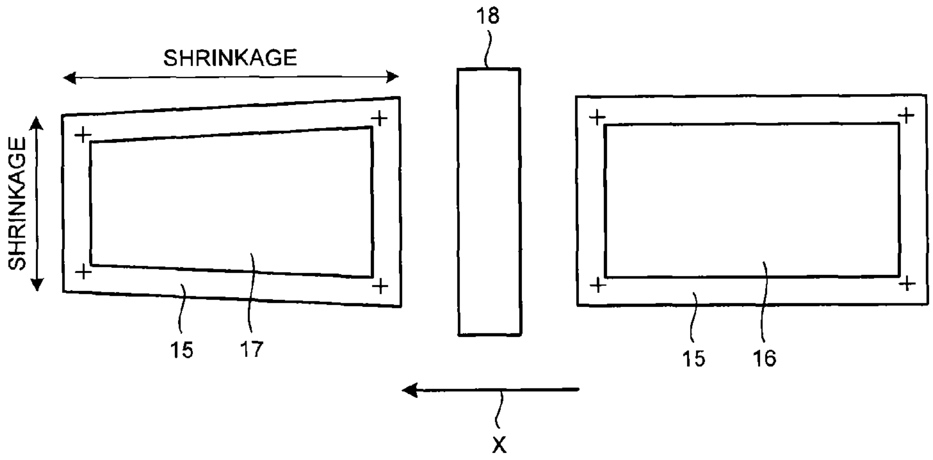
FIG. 2 is a schematic diagram for explaining a deformation of a sheet occurring when the sheet passes through a fixing unit.

FIG. 2 is a schematic diagram for explaining a deformation of a sheet occurring when the sheet passes through a fixing unit. The arrow X illustrated in FIG. 2 indicates a conveying direction of a sheet 15. An image 16 before fixing, which is a toner image formed on the sheet 15, is heated and pressed in the fixing unit 18 so as to be fixed to the sheet 15. In the fixing, the sheet 15 is heated and pressed while tensional force is applied in the width direction of the sheet 15 to prevent occurrence of wrinkles on the sheet 15.

In some cases, this manner causes the image widths at the leading and trailing ends and the image magnification in the main-scanning direction, and the image width and the image magnification in the sub-scanning direction in one page to change in the sheet 15 as illustrated on the left side of the fixing unit 18 in FIG. 2.

FIGS. 3A, 3B, and 3C are conceptual views for explaining countermeasures against such a deformation of an output image 17 after fixing. FIG. 3A illustrates the input image data 8 input to the writing module 1 (refer to FIG. 1). FIG. 3B illustrates the image 16 on the sheet 15 before being fixed. FIG. 3C illustrates the output image 17 after being fixed to the sheet 15.

For example, when an image is formed on the basis of the input image data 8 as illustrated in FIG. 3A, an image is formed in such a manner that the image width on the leading end side is enlarged, the magnification is gradually changed toward the trailing end, and a writing starting position is changed as the image 16 before fixing so as to cancel the deformation of the image due to the deformation of the sheet 15 occurring in the fixing unit 18. As a result, the output image 17 after fixing can be output as illustrated in FIG. 3C with the same image magnification as the input image data 8 illustrated in FIG. 3A, though the sheet 15 is deformed.

FIGS. 4A and 4B are schematic diagrams for explaining production of the drive data 12 based on the writing clock 10. As described above, the clock generation unit 6 produces the writing clock 10 and inputs the writing clock 10 to the image data generation unit 3, and the image data generation unit 3 produces the drive data 12 on the basis of the writing clock 10. In the following example of the embodiment, the clock period can be changed by plus or minus one sixteenth of the clock period (also described as ±1⁄16 clock).

The change of the period of the writing clock 10 enables the size of one pixel forming the image to be changed. In a typical state, the period of the writing clock 10 is constant. As illustrated on the left of FIGS. 4A and 4B, the produced drive data 12 corresponds to 16/16 pixel (also described that the drive data is 16/16 pixel), which is the original size of one pixel determined by the apparatus speed.

To increase the image magnification, operation to elongate the period of the writing clock 10 is performed. When $1/16$ clock is added to the writing clock 10 in the typical state, the period of the resulting writing clock 10 is 17/16 clock as illustrated in a central area of FIG. 4A. The drive data 12 produced on the basis of this writing clock 10 is 17/16 pixel corresponding to the elongated period. As a result, the pixel size is enlarged from the original size of one pixel.

In contrast, to reduce the image magnification, operation to shorten the period of the writing clock 10 is performed. When $1/16$ clock is subtracted from the writing clock 10 in the typical state, the period of the resulting writing clock 10 is $15/16$ clock as illustrated on the right in FIG. 4A. The drive data 12 produced on the basis of this writing clock 10 is $15/16$ pixel corresponding to the reduced period. As a result, the pixel size is shrunk from the original size of one pixel. The repetition of such operation in image forming in the main-scanning enables the image magnification to be corrected.

Figure 5A:
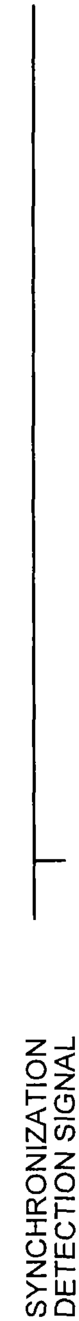
FIGS. 5A to 5C are schematic diagrams for explaining an image magnification correction area in a main-scanning direction in the embodiment.
Figure 5B:
Figure 5C:
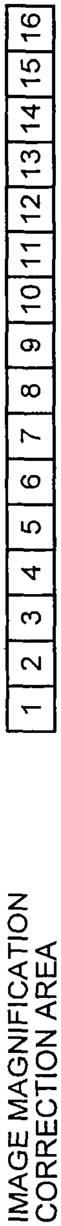

FIGS. 5A to 5C are schematic diagrams for explaining an image magnification correction area in the main-scanning direction. FIG. 5A illustrates a synchronization detection signal. FIG. 5B illustrates a main-scanning gate (main-scanning length). FIG. 5C illustrates the image magnification correction area. To correct the image magnification in the main-scanning direction, the main-scanning length is managed with a plurality of areas divided in the main-scanning direction as illustrated in FIGS. 5B and 5C.

The synchronization detection signal illustrated in FIG. 5A is a reference signal when an image is formed. This signal is a known signal output at each scanning when an image in the main-scanning direction is formed by scanning with the light 14 (refer to FIG. 1).

The main-scanning gate illustrated in FIG. 5B is a signal representing the main-scanning length. The writing starting position is determined at a timing when the main-scanning gate is enabled after the synchronization detection signal is output. An effective period of time of the main-scanning gate illustrated in FIG. 5C is the correction area of the image magnification. In this example, the correction area is equally divided into 16 areas.

Figure 15:
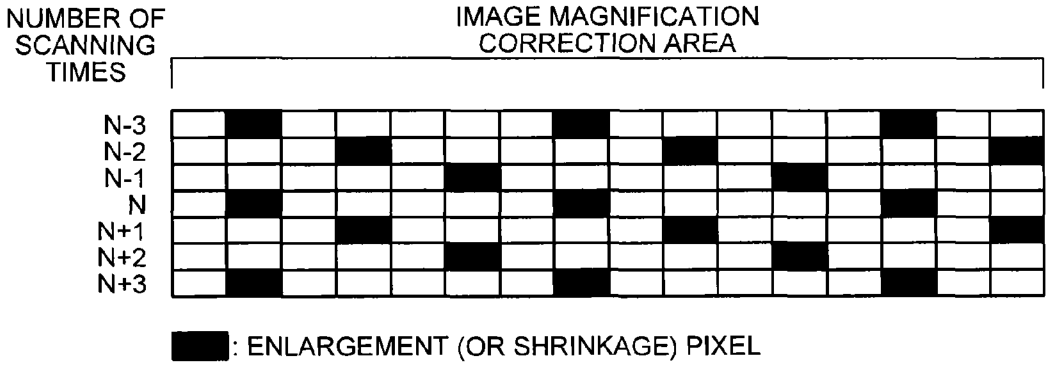
FIG. 15 is an image view illustrating a scattering of correction pixels in the image magnification correction area in the embodiment.

FIG. 15 is an image view illustrating a scattering of correction pixels in the image magnification correction area. In the lateral direction of FIG. 15, the equally-divided 16 image magnification correction areas are represented while in the vertical direction, the number of scanning times in the main-scanning direction are represented. In FIG. 15, the areas filled out in black represent the pixels to be enlarged (or shrunk).

As illustrated in FIG. 15 as an example, the positions of the pixels enlarged or shrunk are not concentrated but are scattered when the magnification correction is performed. When the positions of the pixels enlarged or shrunk are concentrated, pixel distortion occurs. In contrast, when the positions of the pixels enlarged or shrunk are scattered across the area, image distortion hardly occurs. In addition, the positions of the pixels to be enlarged or shrunk are changed in the area at each scanning as illustrated in FIG. 15. This change prevents the pixels from being enlarged or shrunk in series in the sub-scanning direction, thereby preventing the occurrence of visual noises. As a result, the image magnification can be corrected without depending on the resolution.

Figures 6A, 6B, 6C:
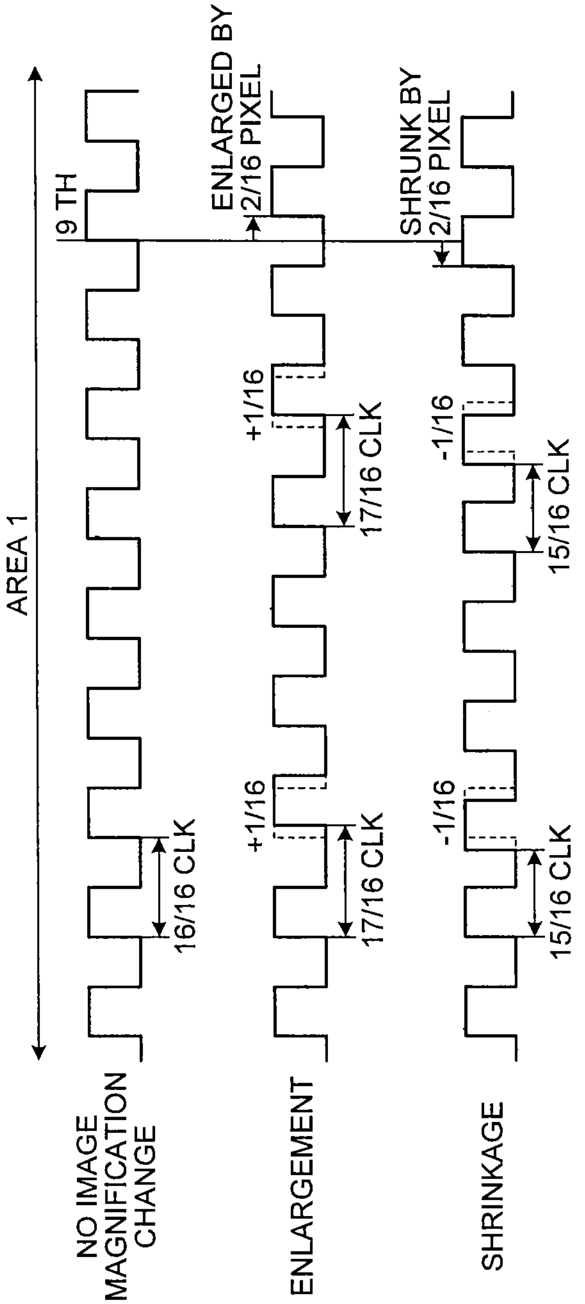
FIGS. 6A to 6C are schematic diagrams illustrating the behavior of the writing clock in an area in a comparison manner when the image magnification is increased or reduced by an amount equivalent to two pixels, FIG. 6A illustrating the behavior when no image magnification is changed, FIG. 6B illustrating the behavior when the image magnification is increased so as to enlarge pixels, and FIG. 6C illustrating the behavior when the image magnification is reduced so as to shrink pixels.

FIGS. 6A to 6C are schematic diagrams illustrating the behavior of the writing clock in an area 1 in a comparison manner when the image magnification is increased or reduced by an amount equivalent to two pixels. FIG. 6A illustrates the behavior when no image magnification is changed (no correction is performed). FIG. 6B illustrates the behavior when the image magnification is increased so as to enlarge the pixels. FIG. 6C illustrates the behavior when the image magnification is reduced so as to shrink the pixels.

When the image magnification is increased by an amount equivalent to two pixels, each area is enlarged by $2/16$ pixel, i.e., 2 pixels/16 areas=$2/16$ pixel, as illustrated in FIG. 6B. The $2/16$ pixel corresponds to $2/16$ clock. The operation to elongate the writing clock period by $1/16$ clock is performed twice. As aforementioned, when the clock period is changed to 17/16 clock from 16/16 clock, the size of the one pixel forming an image is enlarged by $1/16$ pixel. The area 1 is enlarged by $2/16$ pixel by performing the operation twice (a phase of the clock after the enlargement leads by $2/16$ clock the phase of the ninth clock when no correction is performed). The other areas are also enlarged in the same manner as the area 1, i.e., 16 areas are enlarged by $2/16$ pixel each. As a result, the image width is enlarged by a size equivalent to two pixels. That is, the image magnification is increased.

When the image magnification is reduced by an amount equivalent to two pixels, the operation to shrink the writing clock period by $1/16$ clock is performed twice as illustrated in FIG. 6C so as to reduce each area by $2/16$ pixel. As aforementioned, when the writing clock period is changed to $15/16$ clock from 16/16 clock, the size of the one pixel forming an image is shrunk by $1/16$ pixel. The area 1 is shrunk by $2/16$ pixel by performing the operation twice (a phase of the clock after the shrinkage is delayed by $2/16$ clock from the phase of the ninth clock when no correction is performed). The other areas are also shrunk in the same manner as the area 1, i.e., 16 areas are shrunk by $2/16$ pixel each. As a result, the image width is shrunk by a size equivalent to two pixels. That is, the image magnification is reduced.

Figures 7A, 7B, 7C, 7D:
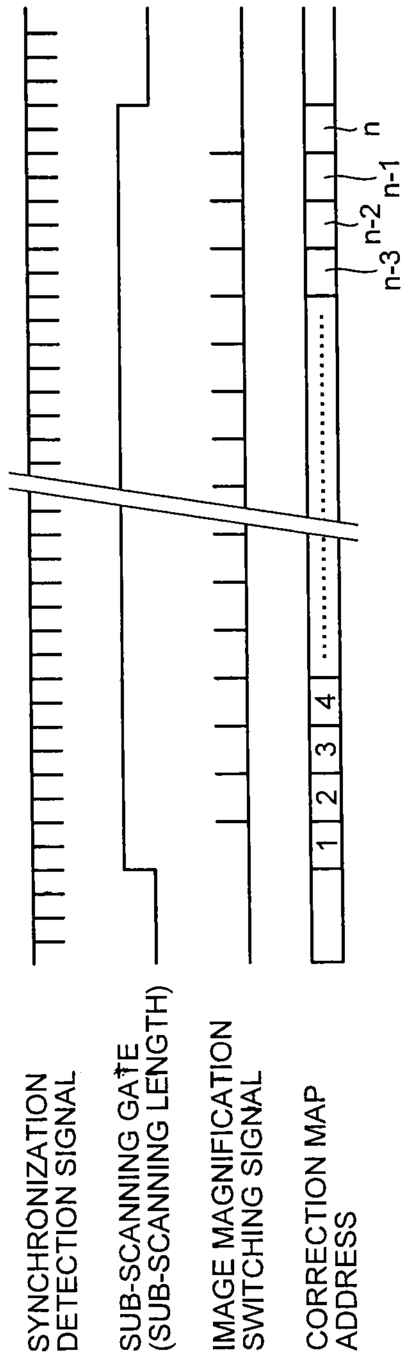
FIGS. 7A to 7D are schematic diagrams for explaining operation of a main image magnification switching signal in the embodiment.

FIGS. 7A to 7C are schematic diagrams for explaining operation of the main image magnification switching signal 13 (refer to FIG. 1). FIG. 7A illustrates the synchronization detection signal. FIG. 7B illustrates a sub-scanning gate (sub-scanning length). FIG. 7C illustrates the main image magnification switching signal. FIG. 7D illustrates a correction map address.

The sub-scanning gate illustrated in FIG. 7B, which is a signal representing a sub-scanning length, represents a range of an output image of one page. The main image magnification switching signal 13 is produced in the sub-scanning gate and synchronized with the synchronization detection signal as illustrated in FIGS. 7A and 7C. The addresses of the correction map retaining the correction values relating to the image magnification in the main-scanning direction are switched by being triggered by the main image magnification switching signal 13, the image magnification in the main-scanning direction is increased or reduced, and the switching proceeds in the sub-scanning direction. That is, the operation described with reference to FIGS. 6A to 6C is performed in the sub-scanning direction accordingly.

Figure 8:
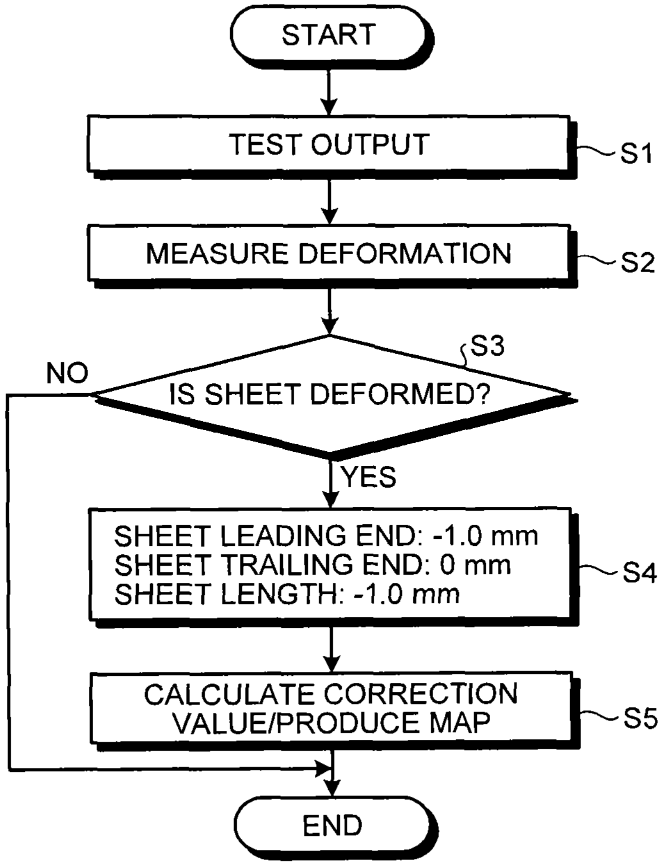
FIG. 8 is a flowchart for explaining a procedure of producing a correction map in the embodiment.

FIG. 8 is a flowchart for explaining a procedure of producing the correction map when an A3 size sheet is used as an example. At S1 (S is the abbreviation of step), prior to correction, a crisscross pattern as illustrated in FIG. 2 or a grid pattern as illustrated in FIG. 3A is output as a test pattern to provide an output sheet on which the pattern is printed.

At S2, the size of the output sheet, the distance between the crisscross patterns, and the grid size are manually measured with an inspection unit using a scanner, a vernier caliper, or the like (S3). At S3, it is determined whether the output sheet is deformed on the basis of the measurement results. If the sheet is not deformed (No at S3), this routine ends.

If the sheet is deformed (Yes at S3), at S4, information relating to the correction, such as information illustrated in Table 1, is input using a printer application or an operation panel provided to the image forming apparatus, for example. Table 1 illustrates an example of information of the sheet deformation.

TABLE 1

| Items | Information |
|---|---|
| Sheet size | 297 mm × 420 mm (A3) |
| Leading end of sheet | −1.0 mm (+: elongation, −: shrinkage) |
| Trailing end of sheet | 0 mm (+: elongation, −: shrinkage) |
| Sheet length | 419 mm |

In the measurement results of this example, the main-scanning image magnification differs in the leading and trailing ends of the sheet by 1 mm and the leading end side is shrunk, and the length of the sheet is shrunk by 1 mm.

Then, at S5, the correction value is calculated and the correction map is produced. A calculation example of the image magnification in the main-scanning direction is described. In this case, the image magnification is corrected from 1 mm to 0 mm in the direction from the leading end toward the trailing end because the shrinkage at the leading end of the sheet is 1 mm and there is no shrinkage at the trailing end of the sheet.

When the resolution is 1200 dpi, a maximum magnification difference of 1 mm is equivalent to 47 pixels. The number of times at which the writing clock period is elongated by 1/16 clock is 756 times, i.e., 1 mm/25.4 mm×1200 dpi/(1/16 clock) =756 times. That is, a pixel having a size of 17/16 pixel is formed 756 times.

The number of times of forming a pixel having a size of 17/16 pixel is reduced from a maximum of 756, at each output of the image magnification switching signal in a direction toward the trailing end. Finally, the number of times of forming a pixel having a size of 17/16 pixel is zero.

When an amount of the correction before and after the magnification switching is equivalent to one pixel (a change of 1/16 pixel in each area), the necessary number of correction values is approximately 48, i.e., (1 mm−0 mm)/25.4 mm×1200 dpi≈48 pieces.

A calculation example of the image magnification in the sub-scanning direction is described below. In this case, the magnification of the image fixed to the sheet is reduced because the length of the sheet is shrunk by 4.2 mm. To form the image in the target size, it is necessary to insert pixels so as to enlarge the image.

When the resolution is 2400 dpi, the number of pixels to be inserted is 94, i.e., (420 mm−419 mm)/25.4 mm×2400 dpi=94 pixels (lines). A total of 94 lines are inserted such that their inserted positions are scattered in the image.

The magnification in the sub-scanning direction is a fixed value in one page and the correction map does not need to be produced because the magnifications are not switched in the page.

The correction map that cancels the deformation of the image due to the deformation of the sheet is produced on the basis of the difference in magnification, the correction amount before and after switching, and the number of necessary correction values described above. The correction map is illustrated in Table 2. Table 2 is an example of the correction map for the main image magnification correction when the resolution in the apparatus is 1200 dpi. The writing starting position is also changed in accordance with an image width magnification. This change means that the timing at which the main-scanning gate is enabled after the synchronization detection signal of FIG. 5A is output is changed. In Table 2, the negative sign (−) of the writing starting position indicates that the writing starts early, while the positive sign (+) of the writing starting position indicates that the writing starts late.

TABLE 2

| Map address | Correction value (Number of times of forming of 17/16 pixel) | | | | | | | | | | | Total insertion number | Image width [mm] | Writing starting position [mm] |
|---|---|---|---|---|---|---|---|---|---|---|---|---|---|---|
| | 1 | 2 | 3 | 4 | 5 | . . . | 12 | 13 | 14 | 15 | 16 | | | |
| 1 | 47 | 47 | 47 | 47 | 47 | . . . | 47 | 47 | 47 | 47 | 47 | 756 | 1.00 | −0.50 |
| 2 | 46 | 46 | 46 | 46 | 46 | | 46 | 46 | 46 | 46 | 46 | 740 | 0.98 | −0.49 |
| 3 | 45 | 45 | 45 | 45 | 45 | | 45 | 45 | 45 | 45 | 45 | 724 | 0.96 | −0.48 |
| 4 | 44 | 44 | 44 | 44 | 44 | | 44 | 44 | 44 | 44 | 44 | 708 | 0.94 | −0.47 |
| 5 | 43 | 43 | 43 | 43 | 43 | | 43 | 43 | 43 | 43 | 43 | 692 | 0.92 | −0.46 |
| 6 | 42 | 42 | 42 | 42 | 42 | | 42 | 42 | 42 | 42 | 42 | 676 | 0.89 | −0.45 |
| 7 | 41 | 41 | 41 | 41 | 41 | | 41 | 41 | 41 | 41 | 41 | 660 | 0.87 | −0.44 |
| 8 | 40 | 40 | 40 | 40 | 40 | | 40 | 40 | 40 | 40 | 40 | 644 | 0.85 | −0.43 |
| 9 | 39 | 39 | 39 | 39 | 39 | | 39 | 39 | 39 | 39 | 39 | 628 | 0.83 | −0.42 |
| 10 | 38 | 38 | 38 | 38 | 38 | | 38 | 38 | 38 | 38 | 38 | 612 | 0.81 | −0.40 |
| 11 | 37 | 37 | 37 | 37 | 37 | | 37 | 37 | 37 | 37 | 37 | 596 | 0.79 | −0.39 |
| 12 | 36 | 36 | 36 | 36 | 36 | | 36 | 36 | 36 | 36 | 36 | 580 | 0.77 | −0.38 |
| 13 | 35 | 35 | 35 | 35 | 35 | | 35 | 35 | 35 | 35 | 35 | 564 | 0.75 | −0.37 |
| 14 | 34 | 34 | 34 | 34 | 34 | | 34 | 34 | 34 | 34 | 34 | 548 | 0.72 | −0.36 |
| 15 | 33 | 33 | 33 | 33 | 33 | | 33 | 33 | 33 | 33 | 33 | 532 | 0.70 | −0.35 |
| 16 | 32 | 32 | 32 | 32 | 32 | | 32 | 32 | 32 | 32 | 32 | 516 | 0.68 | −0.34 |
| 17 | 31 | 31 | 31 | 31 | 31 | | 31 | 31 | 31 | 31 | 31 | 500 | 0.66 | −0.33 |
| 18 | 30 | 30 | 30 | 30 | 30 | | 30 | 30 | 30 | 30 | 30 | 484 | 0.64 | −0.32 |
| 19 | 29 | 29 | 29 | 29 | 29 | | 29 | 29 | 29 | 29 | 29 | 468 | 0.62 | −0.31 |
| 20 | 28 | 28 | 28 | 28 | 28 | | 28 | 28 | 28 | 28 | 28 | 452 | 0.60 | −0.30 |
| 21 | 27 | 27 | 27 | 27 | 27 | | 27 | 27 | 27 | 27 | 27 | 436 | 0.58 | −0.29 |
| 22 | 26 | 26 | 26 | 26 | 26 | | 26 | 26 | 26 | 26 | 26 | 420 | 0.56 | −0.28 |
| 23 | 25 | 25 | 25 | 25 | 25 | | 25 | 25 | 25 | 25 | 25 | 404 | 0.53 | −0.27 |
| 24 | 24 | 24 | 24 | 24 | 24 | | 24 | 24 | 24 | 24 | 24 | 388 | 0.51 | −0.26 |
| 25 | 23 | 23 | 23 | 23 | 23 | | 23 | 23 | 23 | 23 | 23 | 372 | 0.49 | −0.25 |
| 26 | 22 | 22 | 22 | 22 | 22 | | 22 | 22 | 22 | 22 | 22 | 356 | 0.47 | −0.24 |
| 27 | 21 | 21 | 21 | 21 | 21 | | 21 | 21 | 21 | 21 | 21 | 340 | 0.45 | −0.22 |
| 28 | 20 | 20 | 20 | 20 | 20 | | 20 | 20 | 20 | 20 | 20 | 324 | 0.43 | −0.21 |

TABLE 2-continued

| Map address | Correction value (Number of times of forming of 17/16 pixel) 1 | 2 | 3 | 4 | 5 | . . . | 12 | 13 | 14 | 15 | 16 | Total insertion number | Image width [mm] | Writing starting position [mm] |
|---|---|---|---|---|---|---|---|---|---|---|---|---|---|---|
| 29 | 19 | 19 | 19 | 19 | 19 | | 19 | 19 | 19 | 19 | 19 | 308 | 0.41 | −0.20 |
| 30 | 18 | 18 | 18 | 18 | 18 | | 18 | 18 | 18 | 18 | 18 | 292 | 0.39 | −0.19 |
| 31 | 17 | 17 | 17 | 17 | 17 | | 17 | 17 | 17 | 17 | 17 | 276 | 0.37 | −0.18 |
| 32 | 16 | 16 | 16 | 16 | 16 | | 16 | 16 | 16 | 16 | 16 | 260 | 0.34 | −0.17 |
| 33 | 15 | 15 | 15 | 15 | 15 | | 15 | 15 | 15 | 15 | 15 | 244 | 0.32 | −0.16 |
| 34 | 14 | 14 | 14 | 14 | 14 | | 14 | 14 | 14 | 14 | 14 | 228 | 0.30 | −0.15 |
| 35 | 13 | 13 | 13 | 13 | 13 | | 13 | 13 | 13 | 13 | 13 | 212 | 0.28 | −0.14 |
| 36 | 12 | 12 | 12 | 12 | 12 | | 12 | 12 | 12 | 12 | 12 | 196 | 0.26 | −0.13 |
| 37 | 11 | 11 | 11 | 11 | 11 | | 11 | 11 | 11 | 11 | 11 | 180 | 0.24 | −0.12 |
| 38 | 10 | 10 | 10 | 10 | 10 | | 10 | 10 | 10 | 10 | 10 | 164 | 0.22 | −0.11 |
| 39 | 9 | 9 | 9 | 9 | 9 | | 9 | 9 | 9 | 9 | 9 | 148 | 0.20 | −0.10 |
| 40 | 8 | 8 | 8 | 8 | 8 | | 8 | 8 | 8 | 8 | 8 | 132 | 0.17 | −0.09 |
| 41 | 7 | 7 | 7 | 7 | 7 | | 7 | 7 | 7 | 7 | 7 | 116 | 0.15 | −0.08 |
| 42 | 6 | 6 | 6 | 6 | 6 | | 6 | 6 | 6 | 6 | 6 | 100 | 0.13 | −0.07 |
| 43 | 5 | 5 | 5 | 5 | 5 | | 5 | 5 | 5 | 5 | 5 | 84 | 0.11 | −0.06 |
| 44 | 4 | 4 | 4 | 4 | 4 | | 4 | 4 | 4 | 4 | 4 | 68 | 0.09 | −0.04 |
| 45 | 3 | 3 | 3 | 3 | 3 | | 3 | 3 | 3 | 3 | 3 | 52 | 0.07 | −0.03 |
| 46 | 2 | 2 | 2 | 2 | 2 | | 2 | 2 | 2 | 2 | 2 | 36 | 0.05 | −0.02 |
| 47 | 1 | 1 | 1 | 1 | 1 | | 1 | 1 | 1 | 1 | 1 | 20 | 0.03 | −0.01 |
| 48 | 0 | 0 | 0 | 0 | 0 | | 0 | 0 | 0 | 0 | 0 | 0 | 0.00 | −0.00 |

As illustrated in Table 2, the pixels having a size of 17/16 pixel are scattered in each area in the main-scanning of 297 mm=14032 pixels. As a result, no image distortion occurs.

The magnification is 21 μm, which is the change equivalent to one pixel, before and after the magnification correction by switching addresses. The magnification change amount is 1/16 pixel in one area and the positions of the pixels enlarged or shrunk are changed at each scanning as described above. As a result, the change in magnification does not influence the visual noises at border areas. That is, the image magnification can be corrected in accordance with the deformation of the image due to the deformation of the sheet though the resolution is not high but is low. Furthermore, the correction can be performed with a magnification of 10 μm if the number of map addresses is doubled, for example, which is more advantageous for preventing visual noises.

Figure 9:
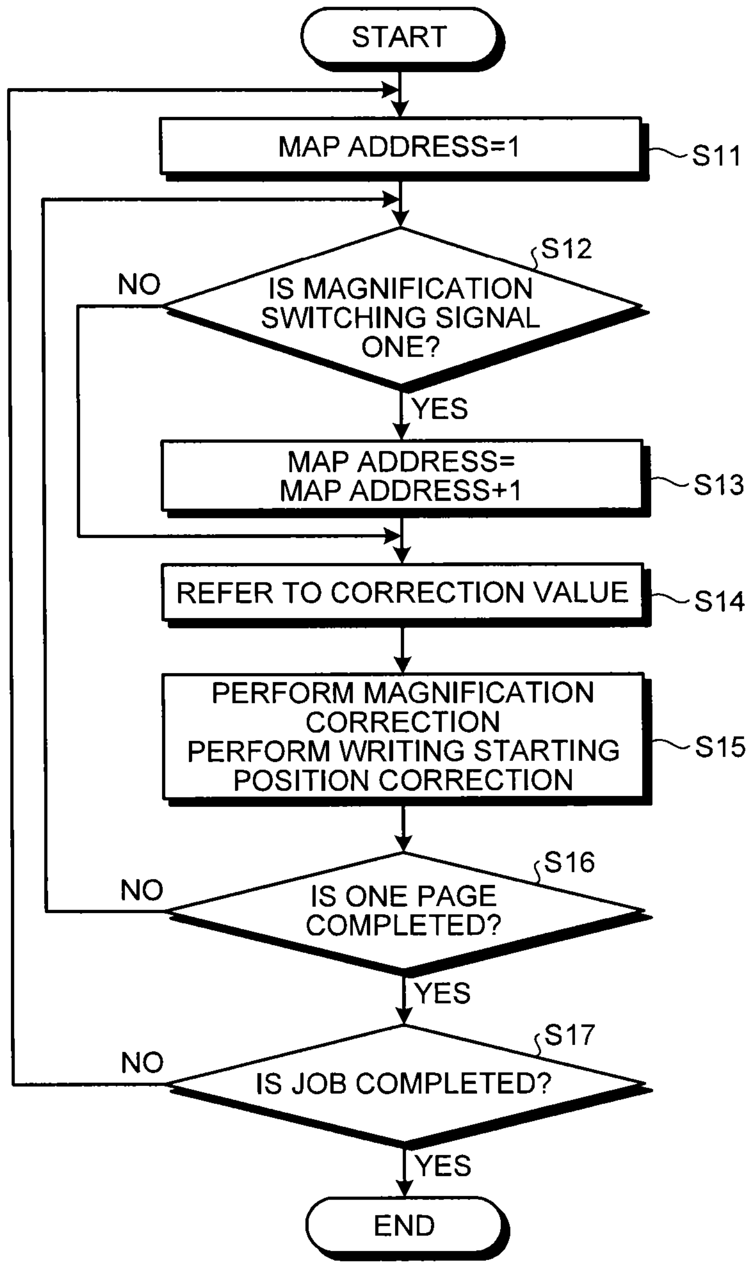
FIG. 9 is a flowchart for explaining a correction procedure in the main-scanning direction in printing in the embodiment.

FIG. 9 is a flowchart for explaining a correction procedure in the main-scanning direction in printing. Once JOB starts, first at S11, the period of the writing clock 10 (refer to FIG. 1) is changed with reference to a correction value of map address 1 so as to enlarge the pixels and to correct the image magnification.

If the image magnification switching signal is valid (=1) at a timing determined by the sub-scanning length and the number of correction values (Yes at S12), the address of the map is incremented by one (S13), the correction value of map address 2 is referred to (S14), and the image magnification and the writing starting position are corrected (S15). The operation is performed until the end of one page (S16).

When JOB covers a plurality of pages, the map address is returned to address 1 (S11), and printing on the next page is performed. If JOB are completed on all of the pages (Yes at S17), this routine ends.

Table 3 is an example of the correction map for the main image magnification correction when the resolution in the apparatus is 600 dpi. The correction values (the number of times of forming a pixel having a size of 17/16 pixel), the total numbers of pixels to be inserted, the image widths, and writing starting positions when the resolution is 600 dpi are calculated in the same manner as the case when the resolution is 1200 dpi.

TABLE 3

| Map address | Correction value (Number of times of forming of 17/16 pixel) 1 | 2 | 3 | 4 | 5 | . . . | 12 | 13 | 14 | 15 | 16 | Total insertion number insertion number | Image width [mm] | Writing starting position [mm] |
|---|---|---|---|---|---|---|---|---|---|---|---|---|---|---|
| 1 | 23 | 23 | 23 | 23 | 23 | . . . | 23 | 23 | 23 | 23 | 23 | 378 | 1.00 | −0.50 |
| 2 | 22 | 22 | 22 | 22 | 22 | | 22 | 22 | 22 | 22 | 22 | 362 | 0.96 | −0.48 |
| 3 | 21 | 21 | 21 | 21 | 21 | | 21 | 21 | 21 | 21 | 21 | 346 | 0.92 | −0.46 |
| 4 | 20 | 20 | 20 | 20 | 20 | | 20 | 20 | 20 | 20 | 20 | 330 | 0.87 | −0.44 |
| 5 | 19 | 19 | 19 | 19 | 19 | | 19 | 19 | 19 | 19 | 19 | 314 | 0.83 | −0.42 |
| 6 | 18 | 18 | 18 | 18 | 18 | | 18 | 18 | 18 | 18 | 18 | 298 | 0.79 | −0.39 |
| 7 | 17 | 17 | 17 | 17 | 17 | | 17 | 17 | 17 | 17 | 17 | 282 | 0.75 | −0.37 |
| 8 | 16 | 16 | 16 | 16 | 16 | | 16 | 16 | 16 | 16 | 16 | 266 | 0.70 | −0.35 |
| 9 | 15 | 15 | 15 | 15 | 15 | | 15 | 15 | 15 | 15 | 15 | 250 | 0.66 | −0.33 |
| 10 | 14 | 14 | 14 | 14 | 14 | | 14 | 14 | 14 | 14 | 14 | 234 | 0.62 | −0.31 |
| 11 | 13 | 13 | 13 | 13 | 13 | | 13 | 13 | 13 | 13 | 13 | 218 | 0.58 | −0.29 |
| 12 | 12 | 12 | 12 | 12 | 12 | | 12 | 12 | 12 | 12 | 12 | 202 | 0.53 | −0.27 |
| 13 | 11 | 11 | 11 | 11 | 11 | | 11 | 11 | 11 | 11 | 11 | 186 | 0.49 | −0.25 |
| 14 | 10 | 10 | 10 | 10 | 10 | | 10 | 10 | 10 | 10 | 10 | 170 | 0.45 | −0.22 |

TABLE 3-continued

| Map address | Correction value (Number of times of forming of 17/16 pixel) 1 | 2 | 3 | 4 | 5 | ... | 12 | 13 | 14 | 15 | 16 | Total insertion number insertion number | Image width [mm] | Writing starting position [mm] |
|---|---|---|---|---|---|---|---|---|---|---|---|---|---|---|
| 15 | 9 | 9 | 9 | 9 | 9 | | 9 | 9 | 9 | 9 | 9 | 154 | 0.41 | −0.20 |
| 16 | 8 | 8 | 8 | 8 | 8 | | 8 | 8 | 8 | 8 | 8 | 138 | 0.37 | −0.18 |
| 17 | 7 | 7 | 7 | 7 | 7 | | 7 | 7 | 7 | 7 | 7 | 122 | 0.32 | −0.16 |
| 18 | 6 | 6 | 6 | 6 | 6 | | 6 | 6 | 6 | 6 | 6 | 106 | 0.28 | −0.14 |
| 19 | 5 | 5 | 5 | 5 | 5 | | 5 | 5 | 5 | 5 | 5 | 90 | 0.24 | −0.12 |
| 20 | 4 | 4 | 4 | 4 | 4 | | 4 | 4 | 4 | 4 | 4 | 74 | 0.20 | −0.10 |
| 21 | 3 | 3 | 3 | 3 | 3 | | 3 | 3 | 3 | 3 | 3 | 58 | 0.15 | −0.08 |
| 22 | 2 | 2 | 2 | 2 | 2 | | 2 | 2 | 2 | 2 | 2 | 42 | 0.11 | −0.06 |
| 23 | 1 | 1 | 1 | 1 | 1 | | 1 | 1 | 1 | 1 | 1 | 26 | 0.07 | −0.03 |
| 24 | 0 | 0 | 0 | 0 | 0 | | 0 | 0 | 0 | 0 | 0 | 0 | 0.00 | −0.00 |

Also in the case when the resolution is 600 dpi, the pixels having a size of 17/16 pixel are scattered in each area in the main-scanning of 297 mm=7016 pixels. As a result, no image distortion occurs. The change in magnification is 42 μm, which is equivalent to one pixel, before and after the magnification correction by switching addresses. The amount change in magnification is 1/16 pixel in one area and the positions of the pixels enlarged or shrunk are changed at each scanning. As a result, the change in magnification does not influence the visual noises. That is, the image magnification can be corrected in accordance with the deformation of the image due to the deformation of the sheet though the resolution is not high but is low.

Figure 10:
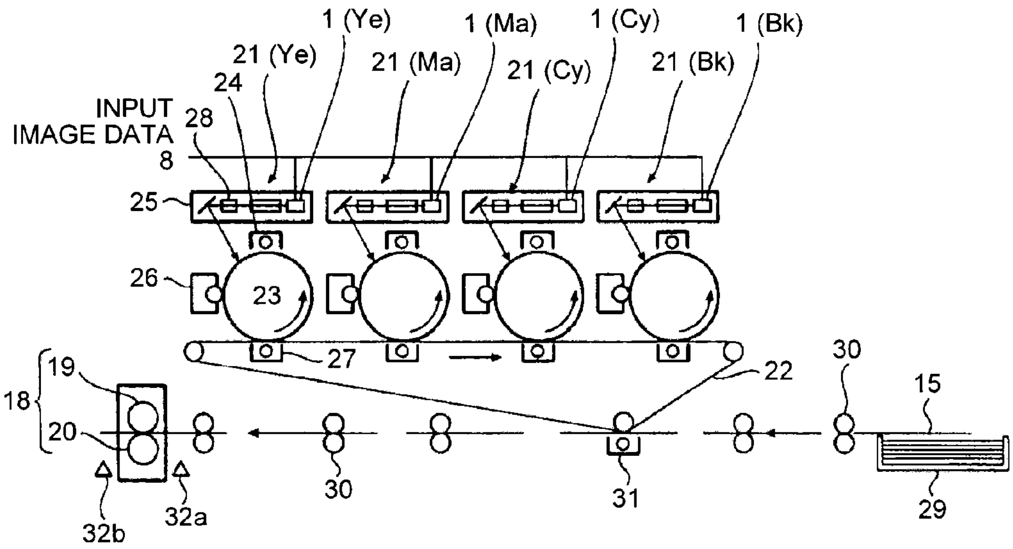
FIG. 10 is a schematic structural view of a full-color image forming apparatus including the writing module in the embodiment.

In the example described above, the clock period is changed by ±1/16 clock. A further increase in resolution of correction enables finer correction to be performed. Depending on a mode of the deformation of the sheet, correction combining the enlargement and shrinkage can be performed beside only enlargement or only shrinkage. FIG. 10 is a schematic structural view of a full-color image forming apparatus including the writing module. As illustrated in FIG. 10, image forming units 21 (21(Ye), 21(Ma), 21(Cy), and 21(Bk)) for four colors of yellow (Ye), magenta (Ma), cyan (Cy), and black (Bk) are arranged along a running direction indicated by the arrow of an endless transfer belt 22.

In each of the image forming units 21, a photosensitive drum 23, a charging unit 24, a writing unit 25, a developing unit 26, and an intermediate transfer unit 27 are arranged at respective predetermined positions. The writing unit 25 is composed of the writing module 1 including the light-emitting device 7 such as a semiconductor laser, and various optical elements 28.

A surface of the photosensitive drum 23 is charged by the charging unit 24. Then, an exposure pattern based on the input image data 8 is formed on the surface of the charged photosensitive drum 23 by the irradiation of the writing unit 25. As a result, a static latent image is formed on the photosensitive drum 23. As illustrated in FIG. 10, the writing modules 1 (Ye), 1 (Ma), 1 (Cy), and 1 (Bk) are provided above the respective image forming units 21 (Ye), 21 (Ma), 21 (Cy), and 21 (Bk). The correction map is basically common to the respective colors.

The static latent image on the photosensitive drum 23 is developed by the developing unit 26, so that a toner image of a corresponding color is formed on the photosensitive drum 23. The toner image is transferred to the transfer belt 22 by the intermediate transfer unit 27.

In the respective image forming units 21, the toner images of the respective colors of yellow (Ye), magenta (Ma), cyan (Cy), and black (Bk) are formed on the corresponding photosensitive drums 23 and transferred onto the transfer belt 22 by the respective intermediate transfer units 27 so as to overlap with each other. As a result, a full-color toner image of four colors is formed.

The sheet 15 is separated from a paper feed tray 29 piece by piece and conveyed by a plurality of carriage roller pairs 30 to a gap between the transfer belt 22 and a transfer unit 31. The color toner image on the transfer belt 22 is transferred onto the sheet 15 by the transfer unit 31.

The sheet 15 on which the color toner image is transferred is conveyed by the carriage roller pairs 30 into the fixing unit 18. The fixing unit 18 includes a heating roller 19 including a heating source and a pressing roller 20 making contact with and moving apart from the heating roller 19. The sheet 15 carrying the color image passes through the gap between the heating roller 19 and the pressing roller 20, during which the color toner image is melted on and fixed to the sheet 15. Thereafter, the sheet 15 is conveyed to a discharge tray (not illustrated).

In duplex printing, the sheet 15 is reversed by a switchback mechanism (not illustrated) after passing through the fixing unit 18 and conveyed to a sheet conveying position succeeding the paper feed tray 29. Thereafter, another toner image is transferred and fixed to the sheet 15, and then the sheet 15 is conveyed to the discharge tray.

As described above, the sheet deformation may be measured by manual operation with an inspection unit, a vernier caliper, or the like. An example of an automatic measurement is described below that measures the deformation in more real time.

As illustrated in FIG. 10, sensors 32*a* and 32*b*, which measure the size of the sheet 15, are provided at a sheet entrance and a sheet exit of the fixing unit 18. The sensors 32*a* and 32*b* are optical sensors, for example. The amount of deformation of the sheet 15 occurring when the sheet 15 passes through the fixing unit 18 is detected on the basis of a difference in output between the sensors 32*a* and 32*b*. In this system, information of the sheet deformation amount is fed back to the writing module 1, by which the correction map is rewritten on the basis of the sheet deformation amount information.

An example of measurement and calculation of the sheet deformation amount in printing is described below. As for the measurement in the main-scanning direction, the deformation amounts at three measurement points, i.e., the leading end, the central position, and the trailing end, are calculated from the measurement results of the sensors 32*a* and 32*b*.

The sensor 32*a* outputs the following measurement results: the leading end: Lasn, the central position: Lacn, and the trailing end: Laen (n=1, 2, 3, . . . ). The sensor 32*b* outputs the following measurement results: the leading end: Lbsn, the central position: Lbcn, and the trailing end: Lben (n=1, 2, 3, . . . ).

The measurement values of the first sheet are calculated as follows.

$$Las1-Lbs1=\Delta Ls1$$

$$Lac1-Lbc1=\Delta Lc1$$

$$Lae1-Lbe1=\Delta Le1$$

In the embodiment, the measurement values are calculated sheet by sheet. As for the measurement result, a moving average of the measurement values of the same print sides, such as only front sides or only the back sides, of 10 sheets each is used. Specifically, the first measurement result is the average of the measurement values of the first to the tenth sheets, the second measurement result is the average of the measurement values of the second to the eleventh sheets, and so on. The respective moving averages ΔLs, ΔLc, and ΔLe are the sheet deformation amounts.

Assuming that the leading end of the sheet is the upper side, the deformation is determined as a trapezoidal deformation when ΔLs<ΔLc<ΔLe, while the deformation is determined as an inverse-trapezoidal deformation when $$\Delta Ls>\Delta Lc>\Delta Le.$$

On the basis of the sheet deformation amounts of the front side and the back side of the sheet, the following can be determined. The overall magnification in the main-scanning direction can be determined from each ΔLc of the front and the back sides, for example. The level of the trapezoidal deformation can be determined from each ΔLs, ΔLc, and ΔLe of the front and the back sides, for example.

As for the measurement in the sub-scanning direction, the deformation amount is calculated from the measurement results of sheet passage time Tan (n=1, 2, 3, . . . ) at the sensor 32*a* and sheet passage time Tbn (n=1, 2, 3, . . . ) at the sensor 32*b*.

As for the measurement value of the first sheet, $$Ta1-Tb1=\Delta T1.$$

As for the measurement in the sub-scanning direction, in the embodiment, the moving average of the measurement values of the same sides of 10 sheets each is used as the measurement result in the same manner as in the main-scanning direction. The moving average value ΔT is the sheet deformation amount. When the moving average value ΔT is a positive value, the sheet is enlarged while when the moving average value ΔT is a negative value, the sheet is shrunk. In addition, the level of the enlargement or shrinkage of the front and the back sides can be determined by comparing with each other the respective moving average values ΔT of the front and the back sides.

The measurement described above is a simplified measurement. If the number of measurement points is increased or measurement is performed continuously, the image magnification can be uniformed in one page against any sheet deformation by properly rewriting the correction map on the basis of the sheet deformation amount information relating to the sheet deformation as illustrated in FIGS. 16A and 16B.

The continuous measurement requires as many correction map addresses as the number of measurement points, and may thereby involve a huge number of addresses to be required. Therefore, the correction value is calculated by a CPU (not illustrated) or the like, for example, from the measurement results of the measurement points in real time and the image magnification information of the main-sub image magnification processing unit 5 of FIG. 1 is transmitted every time when the main image magnification switching signal 13 in FIG. 7C is produced. As a result, the image magnification in one page can be uniformed without producing the correction map.

Figure 16A:
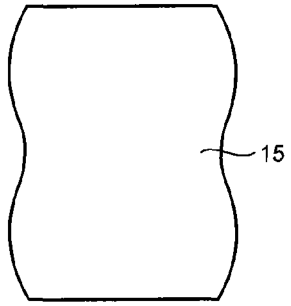
FIGS. 16A and 16B are image views illustrating examples of a measurable sheet deformation in the embodiment.
Figure 16B:
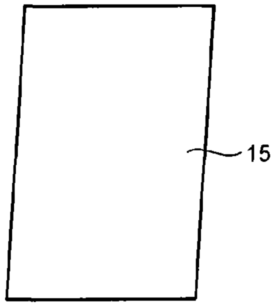

FIGS. 16A and 16B are image views illustrating examples of the measurable sheet deformation in the embodiment. FIG. 16A illustrates an example when both side ends of the sheet 15 are deformed in a waved shape in printing. FIG. 16B illustrates an example when the sheet 15 is deformed in a parallelogram shape as a whole in printing. Such sheet deformation amounts can be measured by the sensors 32*a* and 32*b*.

Figure 11:
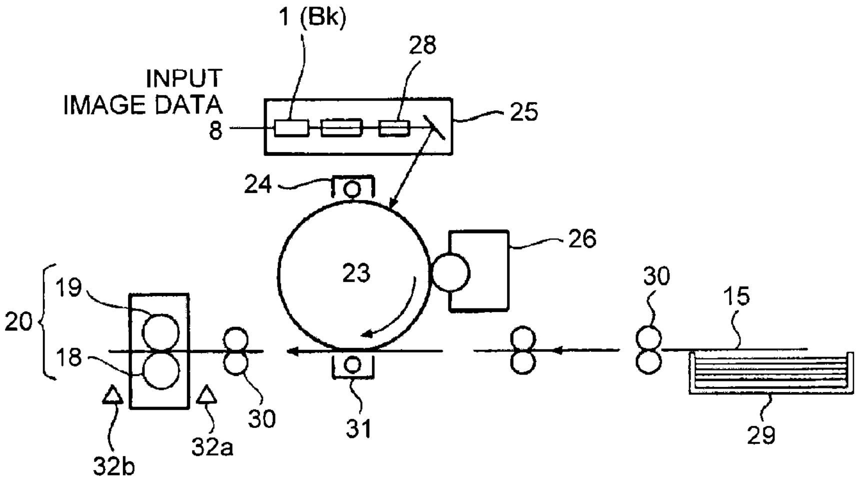
FIG. 11 is a schematic structural view of a monochrome image forming apparatus including the writing module in the embodiment.

FIG. 11 is a schematic structural view of a monochrome image forming apparatus including the writing module. A surface of the photosensitive drum 23 is charged by the charging unit 24. Then, an exposure pattern based on the input image data 8 is formed on the surface of the charged photosensitive drum 23 by the irradiation of the writing unit 25. As a result, a static latent image is formed on the photosensitive drum 23. The static latent image on the photosensitive drum 23 is developed by the developing unit 26, so that a toner image of black (Bk) is formed on the photosensitive drum 23.

The sheet 15 is separated from the paper feed tray 29 piece by piece and conveyed by the carriage roller pairs 30 to a gap between the photosensitive drum 23 and the transfer unit 31. The toner image on the photosensitive drum 23 is transferred onto the sheet 15 by the transfer unit 31. The sheet 15 on which the toner image is transferred is conveyed by the carriage roller pairs 30 into the fixing unit 18. The fixing unit 18 includes the heating roller 19 including a heating source and the pressing roller 20 making contact with and moving apart from the heating roller 19. The sheet 15 carrying the toner image passes through the gap between the heating roller 19 and the pressing roller 20, during which the toner image is melted on and fixed to the sheet 15. Thereafter, the sheet 15 is conveyed to a discharge tray (not illustrated).

In duplex printing, the sheet 15 is reversed by a switchback mechanism (not illustrated) after passing through the fixing unit 18 and conveyed to a sheet conveying position succeeding the paper feed tray 29. Thereafter, another toner image is transferred and fixed to the sheet 15, and then the sheet 15 is conveyed to the discharge tray.

The sensors 32*a* and 32*b*, which measure the size of the sheet 15, are provided at the sheet entrance and the sheet exit of the fixing unit 18. The sensors 32*a* and 32*b* are optical sensors, for example. The amount of deformation of the sheet 15 occurring when the sheet 15 passes through the fixing unit 18 is detected on the basis of a difference in output between the sensors 32*a* and 32*b*. In this system, information of the sheet deformation amount is fed back to the writing module 1, by which the correction map is rewritten on the basis of the sheet deformation amount information.

Figure 12A:
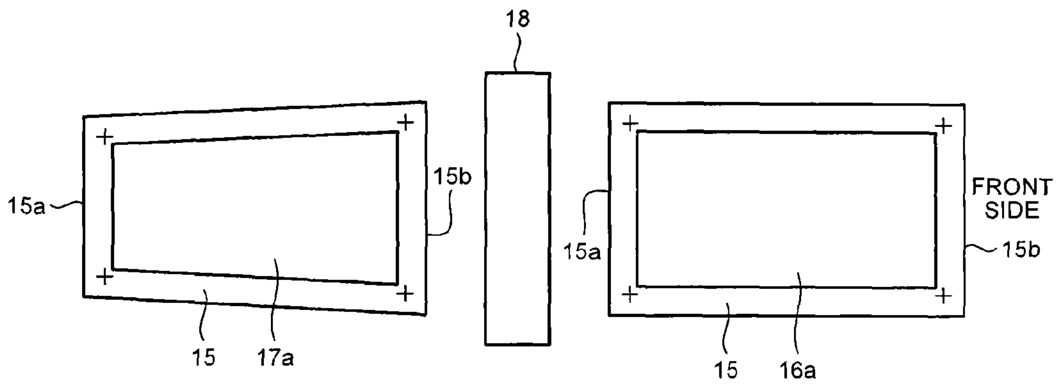
FIGS. 12A and 12B are schematic diagrams for explaining a registration of front and back sides in duplex printing in the embodiment, FIG. 12A illustrating a state in which printing is performed on the front side and FIG. 12B illustrating a state in which printing is performed on the back side.
Figure 12B:
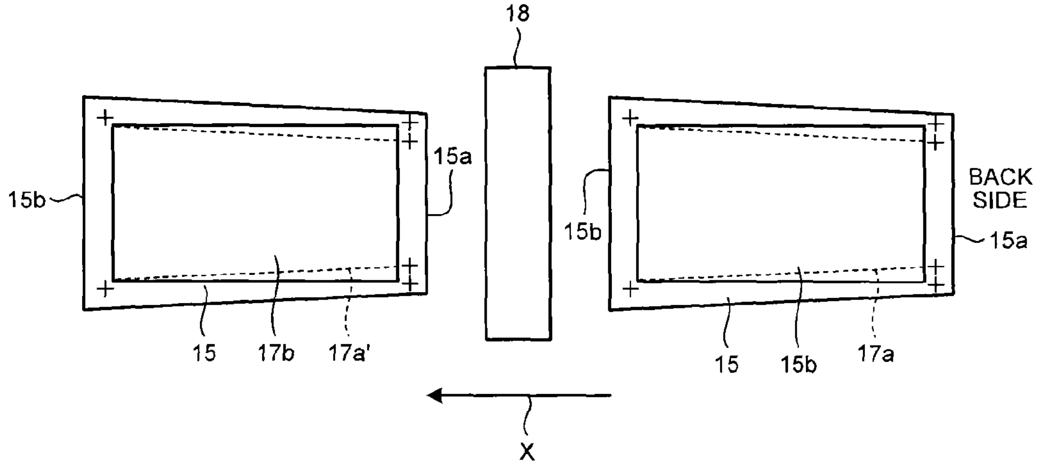

FIGS. 12A and 12B are schematic diagrams for explaining the registration of front and back sides in duplex printing. FIG. 12A illustrates a state in which printing is performed on the front side of the sheet 15. FIG. 15B illustrates a state in which printing is performed on the back side of the sheet 15. In FIGS. 12A and 12B, illustrated are one end 15*a* and the other end 15*b* opposite the end 15*a* of the sheet 15, an image 16*a* before fixing and an output image 17*a* after fixing in the front-side printing, a re-fixed image 17*a*', and an image 16*b* before fixing and an output image 17*b* after fixing in the back-side printing, the fixing unit 18, and the arrow X indicating the conveying direction of the sheet 15.

In the duplex printing, the front side of the sheet 15 is subjected to fixing first while the one end 15*a* serves as the leading end, resulting in the sheet 15 being deformed as illustrated on the left of FIG. 12A. This is because, as described above, the sheet 15 is heated and pressed while tensional force is applied in the width direction of the sheet 15. Thereafter, the sheet 15 is reversed by the switchback mechanism in the image forming apparatus such that the front and back sides are in reverse. As a result, the leading end of the sheet 15 entering the fixing unit 18 is changed to the other end 15*b* from the one end 15*a*.

In the fixing, the sheet 15 is heated and pressed while tensional force is applied in the width direction of the sheet 15 in the same manner as the fixing of the front side, resulting in the one end 15*a* of the sheet 15 being elongated. As a result, the sheet 15 resembles the state of the sheet 15 illustrated on the right of FIG. 12A.

Consequently, the width of the image on the one end 15*a* side of the sheet 15 differs in front and back sides, i.e., the image magnification differs in both sides. If the correction of the invention is not performed, i.e., the correction is performed in the conventional manner, the trailing end of the output image after fixing does not coincide with the trailing end of the output image previously formed on the front side and after being fixed when the sheet output from the fixing unit 18 is viewed from the upper position (the back side). As a result, a phenomenon occurs that the registration accuracy deteriorates.

In contrast, the invention enables the registration of the front and back sides of the sheet 15 by changing the image magnification of the image on the front side of the sheet 15 so as to coincide with the image on the back side or by changing the image magnification of the image on the back side of the sheet 15 so as to coincide with the image on the front side.

FIGS. 13A to 13C are image views illustrating the results of the image magnification correction in the main-scanning direction. In this case, correction is performed every four lines. The correction of 16/16 clock±1/16 clock is performed twice in the beginning four lines, four times in the succeeding four lines, and six times in the ending four lines.

FIG. 13A illustrates the image in which no correction is performed. FIG. 13B illustrates the image in which correction is performed so as to enlarge the image. FIG. 13C illustrates the image in which correction is performed so as to shrink the image. The hatched areas are the areas in each of which the size of the pixel is changed by changing the clock period. The pixel in each of the hatched areas corresponds to 17/16 clock or 15/16 clock of FIG. 6B or 6C, respectively.

FIGS. 14A to 14C are image views illustrating the results of the image magnification correction in the sub-scanning direction. The image magnification correction in the sub-scanning direction is performed using the pixel insertion-removal information 11 produced by the main-sub image magnification processing unit 5 illustrated in FIG. 1. The data sent from the data buffer unit 2 is processed by the image data generation unit 3. In this case, the correction (insertion or removal of pixel) is performed at every eight pixel intervals and every four lines.

FIG. 14A illustrates the image in which no correction is performed. When the sub image magnification is increased, the pixel insertion-removal information 11 instructs enlargement. In accordance with the instruction, one pixel is inserted to each of the hatched areas in FIG. 14B. When the pixels are inserted, the pixels to be formed in the respective hatched areas are shifted in the sub direction (in the downward direction in FIG. 14B). The insertion is repeated several times, resulting in the image magnification being increased.

When sub image magnification is reduced, likewise, the pixel insertion-removal information 11 instructs shrinkage. In accordance with the instruction, one pixel is removed from each of the hatched areas in FIG. 14C. When the pixels are removed, the pixels to be formed in the respective hatched areas are shifted in the sub direction (in the upward direction in FIG. 14C). The removal is repeated several times, resulting in the image magnification being reduced.

As described above, the embodiments are summarized as follows:

(1) An image forming apparatus includes: a photosensitive element; a charging unit that charges a surface of the photosensitive element; a writing unit that forms a static latent image on the photosensitive element by irradiating the charged surface of the photosensitive element with light based on input image data; a developing unit that supplies toner to the static latent image on the photosensitive element so as to form a toner image; a transfer unit that transfers the toner image onto a recording medium; and a fixing unit that fixes the toner image to the recording medium by applying heat and pressure to the toner image. The writing unit includes: a data buffer unit that buffers the input image data; an image data generation unit that produces image data; a main-sub image magnification processing unit that performs image magnification processing in a main-scanning direction and a sub-scanning direction; a clock generation unit that changes a writing clock period; a correction map that retains image magnification information corresponding to a deformation of the recording medium caused by application of heat and pressure from the fixing unit; and a light-emitting device that irradiates the photosensitive element with light on the basis of drive data from the image data generation unit. A change in an image magnification in the main-scanning direction is adjusted such that, with reference to the image magnification information of the correction map, the writing clock period is slightly changed so as to enlarge or shrink a formed pixel in the main-scanning direction and enlargement or shrinkage in the sub-scanning direction is further performed, so that an image deformation caused by the deformation of the recording medium is canceled.

(2) An image forming apparatus includes: a photosensitive element; a charging unit that charges a surface of the photosensitive element; a writing unit that forms a static latent image on the photosensitive element by irradiating the charged surface of the photosensitive element with light based on input image data; a developing unit that supplies toner to the static latent image on the photosensitive element so as to form a toner image; an endless intermediate transfer member; an intermediate transfer unit that transfers the toner image on the photosensitive element onto the intermediate transfer member; a recording medium transfer unit that transfers the toner image on the intermediate transfer member onto a recording medium; and a fixing unit that fixes the toner image to the recording medium by applying heat and pressure to the toner image. The writing unit includes: a data buffer unit that buffers the input image data; an image data generation unit that produces image data; a main-sub image magnification processing unit that performs image magnification processing in a main-scanning direction and a sub-scanning direction; a clock generation unit that changes a writing clock period; a correction map that retains image magnification information corresponding to a deformation of the recording medium caused by application of heat and pressure from the fixing unit; and a light-emitting device that irradiates the photosensitive element with light on the basis of drive data from the image data generation unit. A change in an image magnification in the main-scanning direction is adjusted such that, with reference to the image magnification information of the correction map, the writing clock period is slightly changed so as to enlarge or shrink a formed pixel in the main-scanning direction and enlargement or shrinkage in the sub-scanning direction is further performed, so that an image deformation caused by the deformation of the recording medium is canceled.

(3) An image forming apparatus includes: a photosensitive element; a charging unit that charges a surface of the photosensitive element; a writing unit that forms a static latent image on the photosensitive element by irradiating the charged surface of the photosensitive element with light based on input image data; a developing unit that supplies toner to the static latent image on the photosensitive element so as to form a toner image; a transfer unit that transfers the toner image onto a recording medium; a fixing unit that fixes the toner image to the recording medium by applying heat and pressure to the toner image; and sensors that are provided at an entrance and an exit of the recording medium to and from the fixing unit and detect an amount of a deformation of the recording medium occurring when the recording medium passes through the fixing unit. The writing unit includes: a data buffer unit that buffers the input image data; an image data generation unit that produces image data; a main-sub image magnification processing unit that performs image magnification processing in a main-scanning direction and a sub-scanning direction; a clock generation unit that changes a writing clock period; and a light-emitting device that irradiates the photosensitive element with light on the basis of drive data from the image data generation unit. Image magnification information is produced on the basis of deformation amount information of the recording medium from the sensors. A change in an image magnification in the main-scanning direction is adjusted such that, with reference to the image magnification information, the writing clock period is slightly changed so as to enlarge or shrink a formed pixel in the main-scanning direction and enlargement or shrinkage in the sub-scanning direction is further performed, so that an image deformation caused by the deformation of the recording medium is canceled.

(4) An image forming apparatus includes: a photosensitive element; a charging unit that charges a surface of the photosensitive element; a writing unit that forms a static latent image on the photosensitive element by irradiating the charged surface of the photosensitive element with light based on input image data; a developing unit that supplies toner to the static latent image on the photosensitive element so as to form a toner image; an endless intermediate transfer member; an intermediate transfer unit that transfers the toner image on the photosensitive element onto the intermediate transfer member; a recording medium transfer unit that transfers the toner image on the intermediate transfer member onto a recording medium; a fixing unit that fixes the toner image to the recording medium by applying heat and pressure to the toner image; and sensors that are provided at an entrance and an exit of the recording medium to and from the fixing unit and detect an amount of a deformation of the recording medium occurring when the recording medium passes through the fixing unit. The writing unit includes: a data buffer unit that buffers the input image data; an image data generation unit that produces image data; a main-sub image magnification processing unit that performs image magnification processing in a main-scanning direction and a sub-scanning direction; a clock generation unit that changes a writing clock period; and a light-emitting device that irradiates the photosensitive element with light on the basis of drive data from the image data generation unit. Image magnification information is produced on the basis of deformation amount information of the recording medium from the sensors. A change in an image magnification in the main-scanning direction is adjusted such that, with reference to the image magnification information, the writing clock period is slightly changed so as to enlarge or shrink a formed pixel in the main-scanning direction and enlargement or shrinkage in the sub-scanning direction is further performed, so that an image deformation caused by the deformation of the recording medium is canceled.

Thereby, the period of the writing clock is slightly changed periodically or at appropriate positions in accordance with the image magnification so as to enlarge or shrink a formed pixel in the main-scanning direction, and this is changed along the sub-scanning direction, thereby correcting the image magnification in the main-scanning direction so as to cancel the image deformation due to the deformation of the recording medium, without performing correction requiring an increase in the number of buffers such as memories or high speed data processing, such as the correction performed by inserting one pixel to or removing one pixel from image data. As a result, the image forming apparatus can perform the correction of the change in the image magnification even when the resolution is not high particularly in the main-scanning direction.

(5) The image magnification using the correction map can be changed using a combination of enlargement and shrinkage. This combination enables the correction of the change in the image magnification to be performed on various deformations of the recording medium.

(6) The sensors that detect the amount of the deformation of the recording medium occurring when the recording medium passes through the fixing unit are provided at the entrance and exit of the recording medium to and from the fixing unit. The image magnification information can be rewritten on the basis of the deformation amount information of the recording medium from the sensors. That is, the deformation of the recoding medium is measured and the image magnification information can be written on the basis of the measurement results. This enables the correction of the change in the image magnification to be automatically performed in accordance with the deformation of the recording medium in printing.

(7) In addition, the correction map in the writing unit is common to different colors. This makes it possible to quickly correct the change in the image magnification due to the deformation of the recording medium because the access time needed to rewrite the image magnification information when the change in the image magnification is automatically corrected is reduced to one fourth of that in a case where the correction map is retained for each color.

(8) Furthermore, the images are formed on the front and the back sides of the recording medium. The image magnification can be changed using the correction map on the images of the front and the back sides of the recording medium. As a result, the registration of the front and the back sides can be made for various deformations of the recording medium.

The embodiments can provide an image forming apparatus that can correct a change in an image magnification without using high-resolution data particularly in the main-scanning direction. This is because, in the image forming apparatus, the period of the writing clock is changed periodically or at appropriate positions in accordance with the image magnification so as to enlarge or shrink a formed pixel in the main-scanning direction, thereby correcting the image magnification in the main-scanning direction so as to cancel the change in the image due to the deformation of the recording medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
- a photosensitive element;
- a charging unit that charges a surface of the photosensitive element;
- a writing unit that forms a static latent image on the photosensitive element by irradiating the charged surface of the photosensitive element with light based on input image data;
- a developing unit that supplies toner to the static latent image on the photosensitive element so as to form a toner image;
- a transfer unit that transfers the toner image onto a recording medium; and
- a fixing unit that fixes the toner image to the recording medium by applying heat and pressure to the toner image, wherein
- the writing unit includes:
  - a data buffer unit that buffers the input image data;
  - an image data generation unit that produces image data;
  - a main-sub image magnification processing unit that performs image magnification processing in a main-scanning direction and a sub-scanning direction;
  - a clock generation unit that changes a writing clock period;
  - a correction map that retains image magnification information corresponding to a deformation of the recording medium caused by application of heat and pressure from the fixing unit; and
  - a light-emitting device that irradiates the photosensitive element with light on the basis of drive data from the image data generation unit, and
- the writing unit is configured to slightly change the writing clock period so as to enlarge or shrink a formed pixel in the main-scanning direction and further perform enlargement or shrinkage in the sub-scanning direction with reference to the image magnification information of the correction map, and thus cancel an image deformation caused by the deformation of the recording medium and correct a change in an image magnification in the main-scanning direction.

2. The image forming apparatus according to claim 1, further comprising:
- sensors that are provided at an entrance and an exit of the recording medium to and from the fixing unit and detect an amount of the deformation of the recording medium occurring when the recording medium passes through the fixing unit, wherein
- the image magnification information is able to be rewritten on the basis of deformation amount information of the recording medium from the sensors.

3. The image forming apparatus according to claim 1, wherein the image magnification processing allows a combination of enlargement and shrinkage.

4. The image forming apparatus according to claim 1, wherein images are formed on a front side and a back side of the recording medium, and the image magnification processing can be performed on both images of the front and the back sides of the recording medium.

5. An image forming apparatus, comprising:
- a photosensitive element;
- a charging unit that charges a surface of the photosensitive element;
- a writing unit that forms a static latent image on the photosensitive element by irradiating the charged surface of the photosensitive element with light based on input image data;
- a developing unit that supplies toner to the static latent image on the photosensitive element so as to form a toner image;
- an endless intermediate transfer member;
- an intermediate transfer unit that transfers the toner image on the photosensitive element onto the intermediate transfer member;
- a recording medium transfer unit that transfers the toner image on the intermediate transfer member onto a recording medium; and
- a fixing unit that fixes the toner image to the recording medium by applying heat and pressure to the toner image, wherein
- the writing unit includes:
  - a data buffer unit that buffers the input image data;
  - an image data generation unit that produces image data;
  - a main-sub image magnification processing unit that performs image magnification processing in a main-scanning direction and a sub-scanning direction;
  - a clock generation unit that changes a writing clock period;
  - a correction map that retains image magnification information corresponding to a deformation of the recording medium caused by application of heat and pressure from the fixing unit; and
  - a light-emitting device that irradiates the photosensitive element with light on the basis of drive data from the image data generation unit, and
- the writing unit is configured to slightly change the writing clock period so as to enlarge or shrink a formed pixel in the main-scanning direction and further perform enlargement or shrinkage in the sub-scanning direction with reference to the image magnification information of the correction map, and thus cancel an image deformation caused by the deformation of the recording medium and correct a change in an image magnification in the main-scanning direction.

6. The image forming apparatus according to claim 5, further comprising:
- sensors that are provided at an entrance and an exit of the recording medium to and from the fixing unit and detect an amount of the deformation of the recording medium occurring when the recording medium passes through the fixing unit, wherein
- the image magnification information is able to be rewritten on the basis of deformation amount information of the recording medium from the sensors.

7. The image forming apparatus according to claim 5, wherein the correction map of the writing unit retains the image magnification information that is used in common.

8. The image forming apparatus according to claim 5, wherein the image magnification processing allows a combination of enlargement and shrinkage.

9. The image forming apparatus according to claim 5, wherein images are formed on a front side and a back side of the recording medium, and the image magnification processing can be performed on both images of the front and the back sides of the recording medium.

10. An image forming apparatus, comprising:

a photosensitive element;

a charging unit that charges a surface of the photosensitive element;

a writing unit that forms a static latent image on the photosensitive element by irradiating the charged surface of the photosensitive element with light based on input image data;

a developing unit that supplies toner to the static latent image on the photosensitive element so as to form a toner image;

a transfer unit that transfers the toner image onto a recording medium;

a fixing unit that fixes the toner image to the recording medium by applying heat and pressure to the toner image; and sensors that are provided at an entrance and an exit of the recording medium to and from the fixing unit and detect an amount of a deformation of the recording medium occurring when the recording medium passes through the fixing unit, wherein the writing unit includes:

a data buffer unit that buffers the input image data;

an image data generation unit that produces image data;

a main-sub image magnification processing unit that performs image magnification processing in a main-scanning direction and a sub-scanning direction;

a clock generation unit that changes a writing clock period; and a light-emitting device that irradiates the photosensitive element with light on the basis of drive data from the image data generation unit, image magnification information is produced on the basis of deformation amount information of the recording medium from the sensors, and the writing unit is configured to slightly change the writing clock period so as to enlarge or shrink a formed pixel in the main-scanning direction and further perform enlargement or shrinkage in the sub-scanning direction with reference to the image magnification information of the correction map, and thus cancel an image deformation caused by the deformation of the recording medium and correct a change in an image magnification in the main-scanning direction.

11. The image forming apparatus according to claim 10, wherein the image magnification processing allows a combination of enlargement and shrinkage.

12. The image forming apparatus according to claim 10, wherein images are formed on a front side and a back side of the recording medium, and the image magnification processing can be performed on both images of the front and the back sides of the recording medium.

* * * * *